United States Patent [19]
Holenberger

[11] Patent Number: 5,444,971
[45] Date of Patent: Aug. 29, 1995

[54] METHOD AND APPARATUS FOR COOLING THE INLET AIR OF GAS TURBINE AND INTERNAL COMBUSTION ENGINE PRIME MOVERS

[76] Inventor: Charles R. Holenberger, 611 S. Euclid St, Fullerton, Calif. 92635

[21] Appl. No.: 54,869

[22] Filed: Apr. 28, 1993

[51] Int. Cl.[6] ............................................. F02C 1/00
[52] U.S. Cl. ..................................... 60/39.02; 60/728
[58] Field of Search .................... 60/39.02, 39.53, 728; 62/175

[56] References Cited

U.S. PATENT DOCUMENTS

| | | | |
|---|---|---|---|
| 2,513,601 | 7/1950 | Traupel | 60/728 |
| 3,733,845 | 5/1973 | Lieberman | 62/175 |
| 3,735,601 | 5/1973 | Stannard, Jr. | 62/175 |
| 3,788,066 | 1/1974 | Nebgen | 60/728 |
| 3,796,045 | 3/1974 | Foster-Pegg | 60/728 |
| 3,852,974 | 12/1974 | Brown | 62/175 |
| 4,676,072 | 6/1987 | Higuchi | 62/175 |

Primary Examiner—Richard A. Bertsch
Assistant Examiner—Timothy S. Thorpe
Attorney, Agent, or Firm—Marcus G. Theodore

[57] ABSTRACT

A multi-stage method and apparatus for cooling the inlet air of internal combustion engine and gas turbine prime movers with various load applications comprising: generating and providing a multi-stage refrigerated cooling system associated with the air inlet of internal combustion engine and gas turbine prime movers which provides thermodynamic efficiencies in accordance with a divided psychrometric inlet air cooling path enthalpy curve; cascading the cooled refrigerant from a first cooling stage as the liquid feed into a subsequent lower temperature cooling stage for cooling to the desired temperature; energizing power means to drive the prime mover and refrigerant cooling system; and adjusting the power means based on current energy costs to optimize net revenues to produce electricity or useful work from the prime mover application.

11 Claims, 10 Drawing Sheets

| Item No. | Description | | Jan | Feb | Mar | Apr | May | June | July | Aug | Sept | Oct | Nov | Dec | Remarks |
|---|---|---|---|---|---|---|---|---|---|---|---|---|---|---|---|
| 1 | Start | Stop | (kW) | (kW) | (kW) | (kW) | (kW) | (kW) | (kW) | (kW) | (kW) | (kW) | (kW) | (kW) | |
| 2 | 12 AM | to 1 AM | 196 | 760 | 1,338 | 1,469 | 2,180 | 3,009 | 3,431 | 3,619 | 2,689 | 1,732 | 1,076 | 57 | |
| 3 | 1 AM | to 2 AM | 174 | 828 | 1,208 | 1,299 | 1,950 | 2,711 | 3,212 | 3,330 | 2,471 | 1,570 | 973 | 0 | |
| 4 | 2 AM | to 3 AM | 129 | 743 | 1,067 | 1,098 | 1,712 | 2,472 | 3,017 | 3,128 | 2,290 | 1,399 | 928 | 0 | |
| 5 | 3 AM | to 4 AM | 66 | 693 | 936 | 954 | 1,468 | 2,292 | 2,862 | 2,918 | 2,080 | 1,240 | 836 | 0 | |
| 6 | 4 AM | to 5 AM | 0 | 563 | 838 | 680 | 1,602 | 1,962 | 2,670 | 2,954 | 2,068 | 1,082 | 766 | 0 | |
| 7 | 5 AM | to 6 AM | 0 | 425 | 725 | 671 | 1,710 | 2,183 | 2,882 | 2,968 | 2,004 | 924 | 759 | 0 | |
| 8 | 6 AM | to 7 AM | 0 | 221 | 707 | 996 | 1,828 | 2,651 | 3,304 | 3,001 | 1,958 | 756 | 581 | 0 | |
| 9 | 7 AM | to 8 AM | 0 | 617 | 1,075 | 1,480 | 2,200 | 3,042 | 3,792 | 3,408 | 2,579 | 1,490 | 888 | 0 | |
| 10 | 8 AM | to 9 AM | 39 | 872 | 1,551 | 1,820 | 2,612 | 3,353 | 4,130 | 3,860 | 3,137 | 2,162 | 1,277 | 196 | |
| 11 | 9 AM | to 10 AM | 405 | 1,208 | 1,979 | 2,112 | 2,960 | 3,711 | 4,361 | 4,240 | 3,742 | 2,798 | 1,647 | 469 | |
| 12 | 10 AM | to 11 AM | 683 | 1,435 | 2,167 | 2,383 | 3,184 | 3,999 | 4,628 | 4,421 | 4,016 | 3,063 | 1,948 | 740 | |
| 13 | 11 AM | to 12 PM | 798 | 1,652 | 2,351 | 2,603 | 3,424 | 4,229 | 4,879 | 4,678 | 4,316 | 3,340 | 2,222 | 841 | |
| 14 | 12 PM | to 1 PM | 948 | 1,893 | 2,563 | 2,735 | 3,743 | 4,457 | 5,119 | 4,922 | 4,540 | 3,690 | 2,528 | 1,097 | |
| 15 | 1 PM | to 2 PM | 1,026 | 1,847 | 2,579 | 2,891 | 3,819 | 4,597 | 5,243 | 5,000 | 4,610 | 3,732 | 2,504 | 1,061 | |
| 16 | 2 PM | to 3 PM | 1,042 | 1,873 | 2,652 | 2,963 | 3,928 | 4,694 | 5,314 | 5,106 | 4,703 | 3,778 | 2,496 | 1,058 | |
| 17 | 3 PM | to 4 PM | 1,005 | 1,895 | 2,748 | 2,994 | 4,062 | 4,709 | 5,335 | 5,213 | 4,811 | 3,877 | 2,530 | 1,063 | |
| 18 | 4 PM | to 5 PM | 798 | 1,694 | 2,443 | 2,839 | 3,805 | 4,707 | 5,258 | 4,977 | 4,418 | 3,357 | 2,174 | 759 | |
| 19 | 5 PM | to 6 PM | 447 | 1,468 | 2,149 | 2,538 | 3,582 | 4,598 | 5,046 | 4,745 | 4,105 | 2,972 | 1,874 | 593 | |
| 20 | 6 PM | to 7 PM | 316 | 1,344 | 1,919 | 2,226 | 3,322 | 4,302 | 4,687 | 4,562 | 3,756 | 2,584 | 1,616 | 337 | |
| 21 | 7 PM | to 8 PM | 298 | 1,305 | 1,879 | 2,058 | 3,102 | 3,830 | 4,435 | 4,376 | 3,585 | 2,470 | 1,589 | 332 | |
| 22 | 8 PM | to 9 PM | 435 | 1,329 | 1,926 | 2,003 | 2,924 | 3,738 | 4,242 | 4,217 | 3,385 | 2,405 | 1,646 | 363 | |
| 23 | 9 PM | to 10 PM | 415 | 1,184 | 1,755 | 1,870 | 2,591 | 3,383 | 4,032 | 3,938 | 3,134 | 2,170 | 1,489 | 266 | |
| 24 | 10 PM | to 11 PM | 345 | 1,096 | 1,648 | 1,636 | 2,383 | 3,160 | 3,751 | 3,725 | 2,918 | 1,980 | 1,412 | 249 | |
| 25 | 11 PM | to 12 PM | 354 | 1,000 | 1,486 | 1,510 | 2,112 | 2,820 | 3,426 | 3,414 | 2,684 | 1,766 | 1,279 | 174 | |
| 26 | SDG&E Rate Season | | Winter | Winter | Winter | Winter | Summer | Summer | Summer | Summer | Summer | Winter | Winter | Winter | Maximum |
| 27 | On-Peak Period Demand (kW) | | 447 | 1,468 | 2,149 | 2,538 | 4,062 | 4,709 | 5,335 | 5,213 | 4,811 | 2,972 | 1,874 | 593 | 5,335 |
| 28 | Simi-Peak Per. Demand (kw) | | 1,042 | 1,895 | 2,748 | 2,994 | 3,322 | 4,302 | 4,687 | 4,562 | 4,016 | 3,877 | 2,530 | 1,097 | 4,687 |
| 29 | Off-Peak Per. Demand (kw) | | 354 | 1,096 | 1,648 | 1,636 | 2,363 | 3,160 | 3,751 | 3,725 | 2,918 | 1,980 | 1,412 | 249 | 3,751 |
| 30 | Max Avg. Demand (kw) | | 1,042 | 1,895 | 2,748 | 2,994 | 4,062 | 4,709 | 5,335 | 5,213 | 4,811 | 3,877 | 2,530 | 1,097 | 5,335 |
| 31 | Avg. Electrical Sales | | Jan | Feb | Mar | Apr | May | June | July | Aug | Sept | Oct | Nov | Dec | Total |
| 32 | Weekdays per Month | | 22 | 18 | 22 | 22 | 20 | 22 | 23 | 21 | 21 | 22 | 19 | 22 | 254 |
| 33 | Weekend & Holidays per Mth | | 9 | 10 | 9 | 8 | 11 | 8 | 8 | 10 | 9 | 9 | 11 | 9 | 111 |
| 34 | On-Peak Period Usage (kWH) | | 23,345 | 74,112 | 130,840 | 150,097 | 527,245 | 703,561 | 832,445 | 727,434 | 681,577 | 176,558 | 96,495 | 27,770 | 4,131,479 |
| 35 | Simi-Pk Period Usage (kWH) | | 167,052 | 318,413 | 582,895 | 652,731 | 494,432 | 706,627 | 865,032 | 756,484 | 615,117 | 805,575 | 454,716 | 174,097 | 6,593,172 |
| 36 | Off-Pk Period Usage (kWH) | | 117,066 | 389,073 | 578,666 | 572,072 | 1,029,947 | 1,134,968 | 1,373,178 | 1,514,411 | 1,122,328 | 764,577 | 560,012 | 97,471 | 9,253,789 |
| 37 | Total Monthly Sales (kWH) | | 307,462 | 781,599 | 1,292,421 | 1,374,900 | 2,051,625 | 2,545,156 | 3,070,655 | 2,998,328 | 2,399,022 | 1,746,710 | 1,111,224 | 299,337 | 19,978,439 |
| 38 | Electrical Sales @ 5¢/kWH | | $15,373 | $39,080 | $64,621 | $68,745 | $102,581 | $127,258 | $153,533 | $149,916 | $119,951 | $87,336 | $55,561 | $14,967 | $996,922 |

Fig. 8

| Item No. | Description | | Jan | Feb | Mar | Apr | May | June | July | Aug | Sept | Oct | Nov | Dec | Remarks |
|---|---|---|---|---|---|---|---|---|---|---|---|---|---|---|---|
| | Start | Stop | (mmBTU) | (mmBTU) | (mmBTU) | (mmBTU) | (mmBTU) | (mmBTU) | (mmBTU) | (mmBTU) | (mmBTU) | (mmBTU) | (mmBTU) | (mmBTU) | |
| 1 | 12 AM | to 1 AM | -2.71 | 0.46 | 3.48 | 4.31 | 8.37 | 13.99 | 17.30 | 18.26 | 11.57 | 5.68 | 2.08 | -3.33 | |
| 2 | 1 AM | to 2 AM | -2.81 | 0.15 | 2.78 | 3.26 | 6.96 | 11.85 | 15.53 | 16.49 | 10.23 | 4.75 | 1.55 | -3.59 | |
| 3 | 2 AM | to 3 AM | -3.01 | -0.23 | 2.03 | 2.19 | 5.56 | 10.23 | 14.04 | 14.90 | 9.06 | 3.60 | 1.31 | -3.59 | |
| 4 | 3 AM | to 4 AM | -3.29 | -0.47 | 1.36 | 1.44 | 4.18 | 9.08 | 12.91 | 13.33 | 7.81 | 2.94 | 0.84 | -3.59 | |
| 5 | 4 AM | to 5 AM | -3.59 | -1.06 | 0.85 | -0.52 | 4.93 | 7.14 | 11.55 | 13.58 | 7.66 | 2.16 | 0.49 | -3.59 | |
| 6 | 5 AM | to 6 AM | -3.59 | -1.68 | 0.27 | -0.57 | 5.54 | 8.43 | 13.04 | 13.68 | 7.27 | 1.28 | -0.16 | -3.59 | |
| 7 | 6 AM | to 7 AM | -3.59 | -2.50 | -0.40 | 1.65 | 6.21 | 11.42 | 16.23 | 13.92 | 6.99 | 0.42 | -0.98 | -3.59 | |
| 8 | 7 AM | to 8 AM | -3.59 | -0.81 | 2.08 | 4.24 | 8.47 | 14.20 | 19.80 | 17.09 | 10.93 | 4.30 | 1.10 | -3.59 | |
| 9 | 8 AM | to 9 AM | -3.41 | 1.02 | 4.64 | 6.17 | 11.15 | 16.61 | 22.52 | 20.18 | 14.92 | 8.23 | 3.15 | -2.71 | |
| 10 | 9 AM | to 10 AM | -1.78 | 2.77 | 7.12 | 7.92 | 13.59 | 18.92 | 24.69 | 23.56 | 19.18 | 12.43 | 5.19 | -1.48 | |
| 11 | 10 AM | to 11 AM | -0.51 | 4.00 | 8.27 | 9.50 | 15.27 | 21.33 | 27.65 | 25.74 | 21.49 | 14.35 | 6.95 | -0.25 | |
| 12 | 11 AM | to 12 PM | 0.64 | 5.21 | 9.43 | 11.08 | 17.17 | 23.40 | 30.08 | 28.15 | 24.24 | 16.50 | 8.63 | 0.66 | |
| 13 | 12 PM | to 1 PM | 1.40 | 6.61 | 10.82 | 11.98 | 19.16 | 25.62 | 32.48 | 30.53 | 26.82 | 18.74 | 10.61 | 2.18 | |
| 14 | 1 PM | to 2 PM | 1.81 | 6.34 | 10.93 | 13.08 | 19.78 | 27.33 | 33.73 | 31.30 | 27.47 | 19.08 | 10.44 | 1.99 | |
| 15 | 2 PM | to 3 PM | 1.89 | 6.49 | 11.43 | 13.61 | 20.70 | 28.18 | 34.48 | 32.37 | 28.35 | 19.46 | 10.40 | 1.98 | |
| 16 | 3 PM | to 4 PM | 1.70 | 6.52 | 12.09 | 13.83 | 21.87 | 28.40 | 34.68 | 33.46 | 29.41 | 20.28 | 10.61 | 2.00 | |
| 17 | 4 PM | to 5 PM | 0.02 | 5.28 | 10.03 | 12.72 | 19.67 | 28.38 | 33.89 | 31.07 | 25.68 | 16.63 | 8.32 | 0.44 | |
| 18 | 5 PM | to 6 PM | -1.59 | 4.17 | 8.16 | 10.65 | 17.88 | 27.35 | 31.75 | 28.79 | 22.27 | 13.67 | 6.50 | -0.92 | |
| 19 | 6 PM | to 7 PM | -2.17 | 3.50 | 7.92 | 8.04 | 16.35 | 24.09 | 28.22 | 27.05 | 19.29 | 10.95 | 5.01 | -2.08 | |
| 20 | 7 PM | to 8 PM | -2.26 | 3.29 | 6.53 | 7.80 | 14.65 | 20.74 | 25.43 | 24.88 | 17.93 | 10.21 | 4.86 | -2.10 | |
| 21 | 8 PM | to 9 PM | -1.64 | 3.43 | 6.82 | 7.28 | 13.34 | 19.15 | 23.57 | 23.37 | 16.90 | 9.79 | 5.20 | -1.96 | |
| 22 | 9 PM | to 10 PM | -1.73 | 2.65 | 5.82 | 6.48 | 11.02 | 16.94 | 21.65 | 20.86 | 14.92 | 8.30 | 4.31 | -2.40 | |
| 23 | 10 PM | to 11 PM | -2.05 | 2.19 | 5.20 | 5.12 | 9.51 | 15.09 | 19.26 | 19.07 | 13.31 | 7.14 | 3.89 | -2.48 | |
| 24 | 11 PM | to 12 PM | -2.01 | 1.88 | 4.29 | 4.42 | 7.93 | 13.30 | 17.22 | 17.15 | 11.52 | 5.87 | 3.16 | -2.81 | |
| 28 | Average NG Usage | | Jan | Feb | Mar | Apr | May | June | July | Aug | Sept | Oct | Nov | Dec | Total |
| 30 | Weekdays per Month | | 22 | 18 | 22 | 22 | 20 | 22 | 23 | 21 | 21 | 22 | 19 | 22 | 254 |
| 31 | Weekend & Holidays per Mth | | 9 | 10 | 9 | 8 | 11 | 8 | 8 | 10 | 9 | 9 | 11 | 9 | 111 |
| 33 | | | | | | | | | | | | | | | |
| 34 | On-Peak Usage (mmBTU) | | -132 | 197 | 472 | 592 | 2,725 | 4,150 | 5,315 | 4,529 | 3,869 | 766 | 311 | -112 | 22,691 |
| 35 | Simi-Peak Usage (mmBTU) | | -193 | 846 | 2,179 | 2,630 | 2,201 | 3,595 | 4,820 | 4,129 | 2,993 | 3,707 | 1,594 | -143 | 28,359 |
| 36 | Off-Peak Usage (mmBTU) | | -848 | 609 | 1,713 | 1,761 | 4,351 | 5,489 | 7,272 | 8,044 | 5,294 | 2,872 | 1,498 | -928 | 37,127 |
| 37 | Total Usage (mmBTU) | | -1,173 | 1,652 | 4,364 | 4,982 | 9,277 | 13,234 | 17,406 | 16,702 | 12,156 | 7,346 | 3,404 | -1,183 | 88,167 |
| 38 | | | | | | | | | | | | | | | |
| 39 | NG Cost @ $3.20/mmBTU | | ($3,755) | $5,286 | $13,966 | $15,944 | $29,685 | $42,349 | $55,699 | $53,447 | $38,900 | $23,506 | $10,892 | ($3,786) | $282,134 |
| 40 | | | | | | | | | | | | | | | |
| 41 | Electrical Sales @ 5¢/kWH | | $15,373 | $39,080 | $64,621 | $68,745 | $102,581 | $127,258 | $153,533 | $149,916 | $119,051 | $87,336 | $55,561 | $14,967 | $998,922 |
| 42 | | | | | | | | | | | | | | | |
| 43 | Net Increased Revenue | | $19,128 | $33,794 | $50,655 | $52,801 | $72,896 | $84,909 | $97,833 | $96,469 | $81,051 | $63,829 | $44,669 | $18,753 | $716,788 |

METHOD AND APPARATUS FOR COOLING THE INLET AIR OF GAS TURBINE AND INTERNAL COMBUSTION ENGINE PRIME MOVERS

BACKGROUND OF THE INVENTION

1. Field

This invention pertains to methods for increasing the performance for gas turbines and internal combustion (IC) engines. Specifically, it relates to a new multi-stage method and apparatus for cooling the inlet air of gas turbines and internal combustion engines to increase their power output and combustion efficiencies.

2. State of the Art

As described in The Second Law by P. W. Arkins, published by Scientific American Books, Inc., 1984, at pages 102–105 the operation of a turbine is thermodynamically described by the Brayton cycle, which is basically a collection of repetitive sequential energy transfer processes. The compressor stage is generally driven by a gas turbine engine, but it is more appropriate to think of it as an axial compressor which is like a rotating fan of some kind. In this stage, the working gaseous fluid (air) is compressed in a series of compressor blades by a turbine and burning it in the combustor section which then drives the hot gases through the turbine blades and powers them. An interconnecting shaft from the compressor section through the turbine section extends out to drive a generator or pump or other mechanical rotating device.

This compression process is adiabatic, and it raises both the temperature and pressure of the compressed air. After the air is compressed, fuel is added and energy is transferred to a high-temperature, high pressure gas stage (because fuel burns, or because there is some kind of heat exchanger fueled by a hot source). Its temperature then rises still further, but the engine is arranged so that at the same time the volume of the gas is allowed to increase; overall, therefore, the gas remains at constant pressure. The hot, expanded gas then enters the turbine stage where there is an adiabatic expansion of the gas against the turbine blades. This cools the gas and extracts its energy as work resulting from the transformation of the incoherent thermal motion of the hot gas into the coherent rotational motion of the blades of the turbine. The last stage then lowers the gas temperature at constant volume via dumping heat into a sink in order to complete the cycle to achieve a viable engine. The technical difficulty of making this cycle practicable requires hot and cold devices to be separated so that the turbine is kept at a high temperature while it is running.

As a thermodynamic process, it is well known that the performance of a gas turbine or IC engine can be increased by cooling the air inlet to densify the air mass flowing into the engine and into the compressor blades or cylinders. Typically this is accomplished via an evaporative cooler associated with the air inlet stream entering the compressor. This choice is due to the low capital cost to install an evaporative cooler in comparison to that of a refrigerated air system. The turbine performance increase when associated with an evaporative cooler is limited to the ambient wet bulb temperature of the region. In addition, evaporative coolers are wet systems with high maintenance problems associated with scaling. They are also dependent on water availability and price.

Therefore, although an evaporative cooler is workable and economical, particularly in low humidity areas, additional performance can be achieved by a source of constant lower temperature refrigerated inlet air. This is especially the case where the optimum turbine/engine performance is achieved at temperatures below that of the daily fluctuating evaporative cooler wet bulb temperature in an area.

Conventional single stage temperature. refrigeration systems consume considerable energy to reduce the ambient inlet air to the temperature to that required for optimum turbine and engine performance.

The present invention reduces the overall power consumption of the inlet air cooling system by providing an improved multi-stage constant air cooling system method and apparatus for optimizing turbine and engine performance.

SUMMARY OF THE INVENTION

The present method and apparatus optimizes the electrical power output performance of gas turbine and internal combustion engine prime movers which can drive a variety of rotating loads, i.e. pumps, generators, compressors, or electrical generator sets. This is accomplished by cooling the turbine/engine inlet air which increases its mass density and throughput. It comprises: first generating a psychrometric inlet air cooling path enthalpy curve beginning with the average ambient air temperature entering the turbine/engine and reducing the air temperature to the optimum air inlet temperature above the ice point for maximum turbine/engine performance. The psychrometric inlet air cooling path enthalpy curve is then sectionalized and divided into dedicated multiple cooling stages to optimize thermodynamic cooling efficiencies by operating the turbine along the least energy intensive segments of the enthalpy curve.

A multi-stage refrigeration system is then structured and associated with the air inlet to provide the multistage cooling along with the thermodynamic efficiencies in accordance with the divided psychrometric turbine inlet air cooling path enthalpy curve. The multistep cooling stage system utilizes primary (direct) or secondary (indirect) cooled refrigerant which is circulated to absorb heat from the inlet air and transfers the same to a heat sink. It is structured such that the cooled primary refrigerant from the first cooling stage is cascaded as the liquid feed into a subsequent cooling stage to incrementally cool the inlet air to the desired optimum performance temperature (generally, the optimum air inlet temperature for maximum turbine performance is the air inlet icing point). By cascading the liquid feed from stage to stage, increased Carnot thermal transfer efficiencies are achieved.

The turbine drive and multi-stage refrigerant cooling system is then powered and adjusted to run based on current energy cost inputs to optimize the net revenues from prime mover output or electrical sales from the turbine generator set. As an example, in one preferred embodiment for a General Electric Model LM 5000 natural gas fired turbine generator set, a first cooling coil utilizing ammonia or other direct (primary) refrigerant is placed within the air inlet to reduce the inlet air temperature from 104 F. DBT (Dry Bulb Temperature), 70 F. WBT (Wet Bulb Temperature) to 59 F. WBT. A second cooling coil is then placed behind the first cooling coil to reduce the temperature to 43 F. DBT (saturated), which is the nominal optimum turbine temperature before icing of the inlet air occurs. To optimize energy usage, the ammonia (or other) refrigerant from the first cooling coil is cooled and then passed as feed into the second cooling coil within the air inlet to achieve the desired refrigeration temperature.

Lower optimal turbine operating temperatures can be achieved below the icing point of the air inlet to further increase the turbine performance of the turbine/generator set. In this embodiment, the inlet air is pre-cooled below the icing point and then re-heated (warmed) back up to prevent freezing and provide additional turbine power output.

It is theoretically possible to divide the psychrometric turbine inlet cooling path enthalpy curve into many (infinite) stages. The optimum system would depend on the capital cost and physical space limitations. Multiple substantially equal enthalpy stages and corresponding staged cooling systems are employed.

To further save energy, if the waste heat from the turbine/engine exhaust can be utilized, this can become a source of direct absorption refrigeration or steam turbine driven compression refrigeration. This use of waste heat provides increased prime mover or generator revenues by reducing parasitic refrigeration loads.

By thermodynamically controlling the turbine operating parameters, daily inlet air temperature fluctuations are avoided. This enables the turbine/engine to be operated at a constant temperature and pressure. This can result in reduced wear, as well as optimizing the electrical output from a turbine generator set or other prime mover application.

Bakersfield, Cal. was chosen as an example where there is a broad range of temperatures and humidities for analysis and comparison. In this case, a dual coil two stage refrigerated inlet air cooling system was constructed comprising: (2) cooling coils, (2) refrigerant recirculator vessels, (2) pumps, (2) compressors and (2) condensers. The cooling coils were mounted within the air inlet of an LM 5000 General Electric natural gas fired turbine associated with a nominal 35.5 MW electric generator. The analysis based on a computer simulation/model of the system found that net energy output of this turbine generator set increased 10% (Net of parasitic power).

In areas where the electric energy revenues are dependent upon the time of generation, an algorithm control system based on the computer simulation model is generally employed to calculate the hourly costs of the fuel energy consumed to generate electric power vs. power sales revenues paid for the electricity produced to develop net cost curves. Based on these hourly net costs to operate the system, the fuel energy inputs to run the turbine generator set are adjusted to optimize net revenues, which may or may not correspond to the optimum turbine performance efficiencies. For example, instead of simple physical performance optimum energy comparisons, a computer program, such as that produced by Kohlenberger Associates Consulting Engineers, Inc. entitled "Program for Controlling Multi-Temperature Staged Refrigeration Systems", Copyright © 1992 by Kohlenberger Associates Consulting Engineers simulated on an Apple Macintosh computer, models the thermodynamic efficiencies of a sectionalized divided psychrometric turbine inlet air cooling path enthalpy curve of the average ambient air temperature turbine performance and the optimum air inlet temperature for maximum turbine performance at a given temperature and altitude. The program then assigns the hourly price of adding refrigerated cooling energy during peak electrical periods to reduce turbine fuel costs, while optimizing electrical output. The cost of added refrigeration energy to produce the increased electrical benefits at a given time is then calculated to generate a net revenue curve. The computer program thus calculates the operating parameters to produce optimum hourly net revenues so that the turbine generator set can be adjusted to generate optimum net revenues.

The present method and apparatus has resulted in net output increases in the turbine/generator set of 10% while at the same time reducing fuel usage 2 to 3%. This then increases operating revenue as much as 2 to 5 percent over those produced by conventional evaporative inlet air cooling systems. These cost savings and revenue increases are significant, particularly where employed with large electrical generation plants These savings will repay the total cost of refrigerated inlet air cooling systems within approximately four years.

DESCRIPTION OF THE DRAWINGS

FIG. 8 is the first sheet of an operating cost analysis of a typical two stage refrigeration system for an LM5000 Gas Turbine.

FIG. 9 is the second sheet of an operating cost analysis of a typical two stage refrigeration system for an LM5000 Gas Turbine.

DESCRIPTION OF THE ILLUSTRATED EMBODIMENTS

Figure 1:
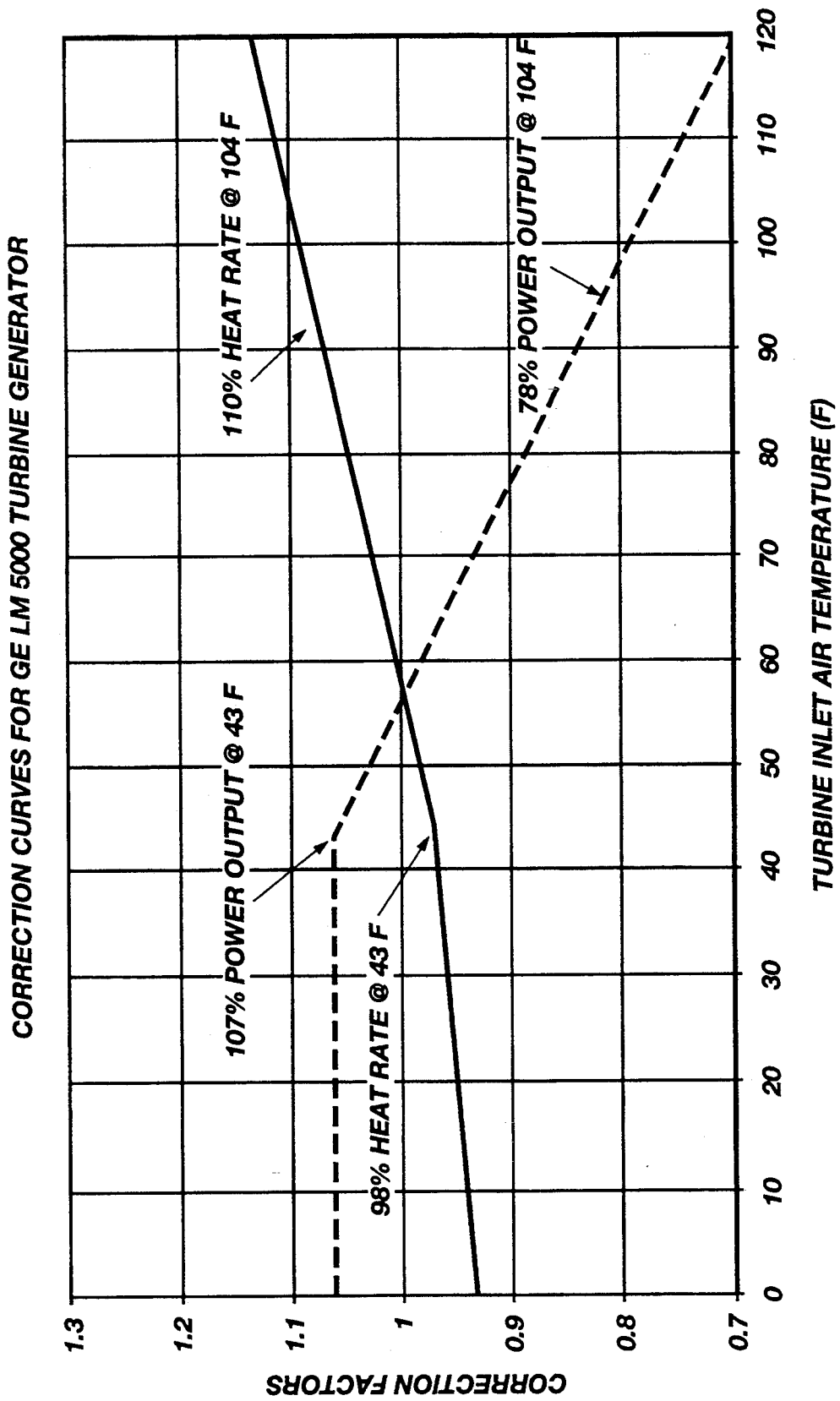
FIG. 1 is an example of a power output and heat rate correction curve for a GE LM 5000 Turbine Generator.
Figure 2:
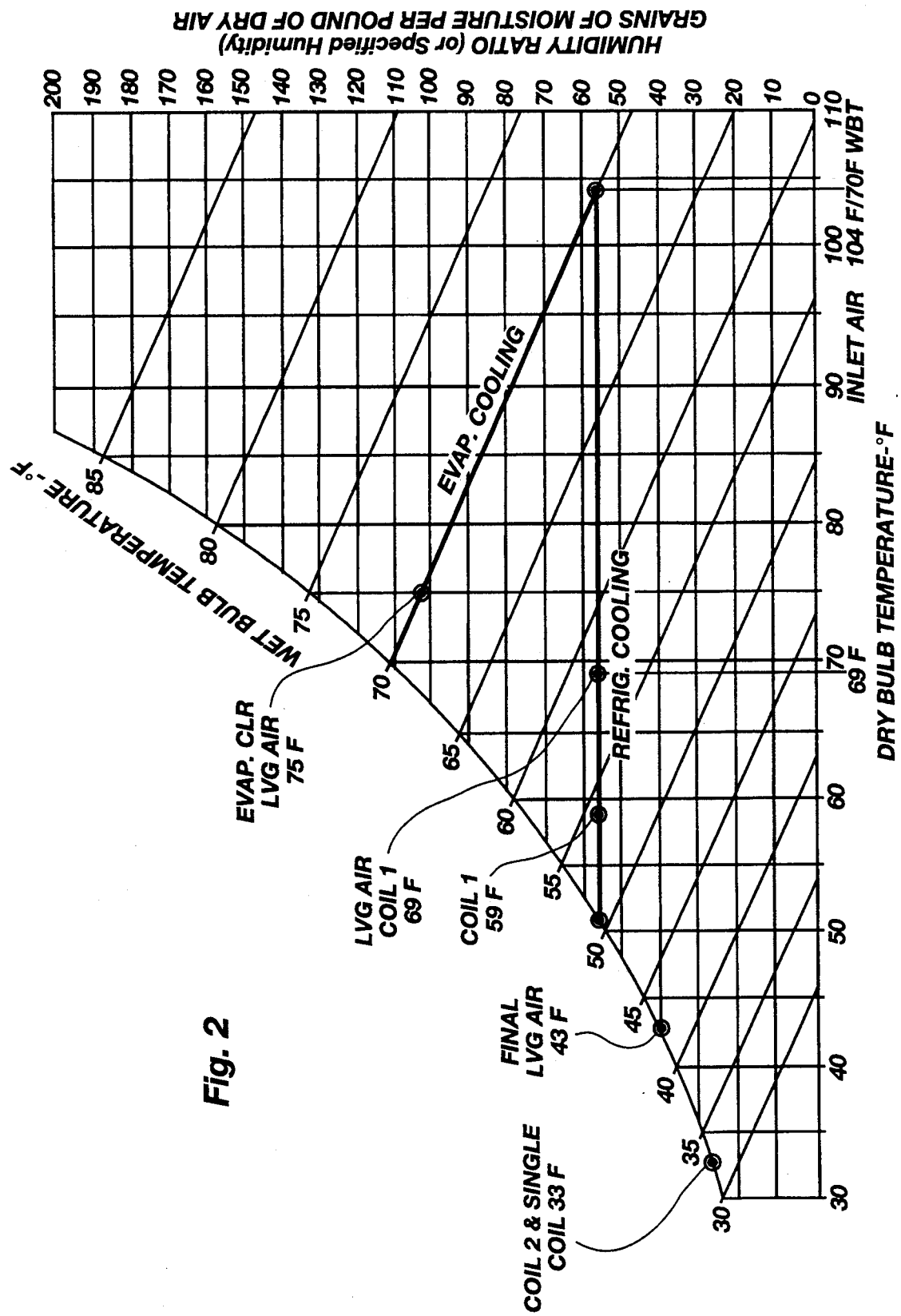
FIG. 2 is an example of a typical psychrometric chart of the Turbine Inlet Air Cooling Path of a GE LM5000 Turbine Generator.
Figure 3:
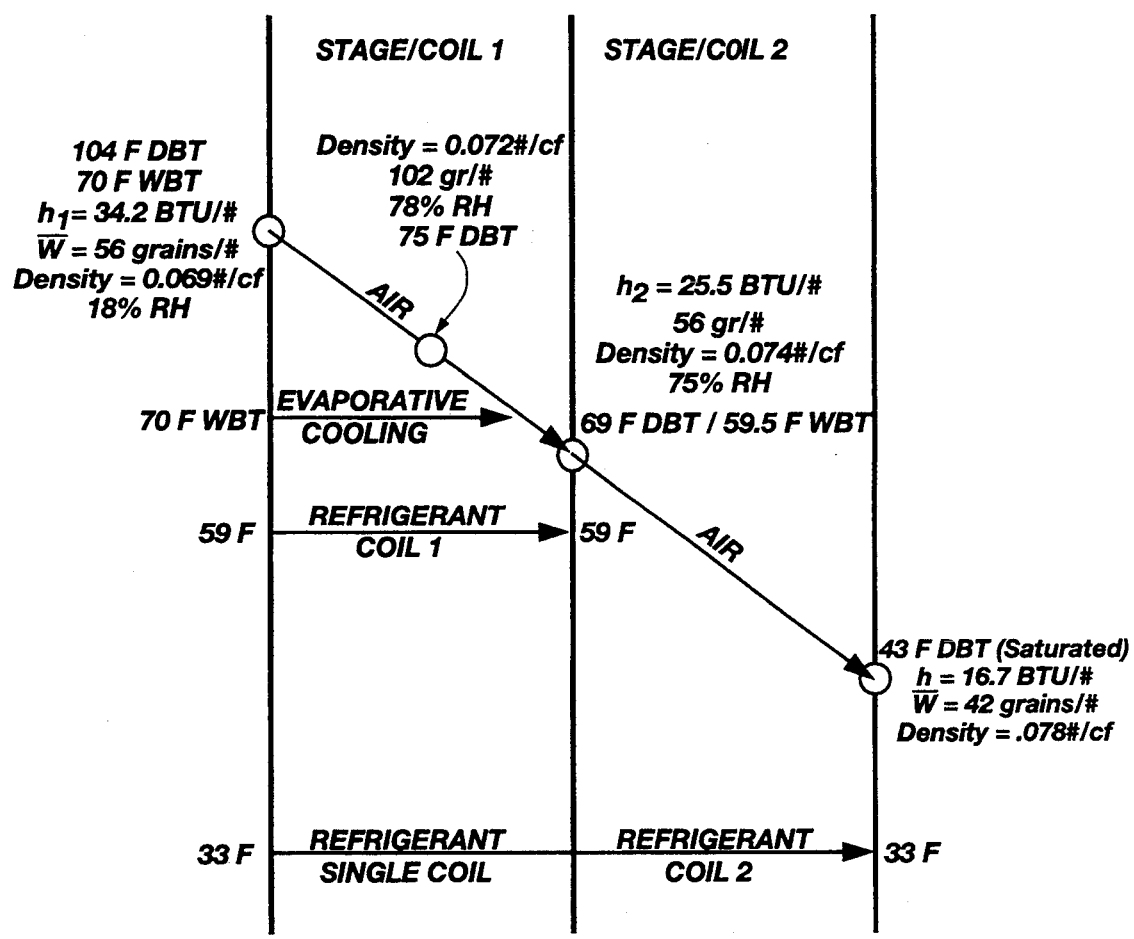
FIG. 3 is schematic diagram of a two stage turbine inlet air cooling coil heat transfer.

FIG. 1 illustrates the increase in turbine performance for a GE LM 5000 natural gas fired turbine as the turbine inlet air temperature is cooled to 43 F., the icing point of the inlet air. At this icing point, optimum power output is 107% of the turbine performance at the standard 60 F. temperature. FIG. 2 illustrates a psychrometric chart showing the turbine inlet air cooling path for the two stage method and cooling system more particularly described in the schematic flow diagram shown in FIG. 4. This psychrometric chart was generated for a two stage coil heat transfer system associated with the turbine air inlet as shown in FIG. 3. An evaporative cooler filters and cools the air inlet of the turbine to reduce inlet air at 104 F. DBT, 70 F. WBT, having a density of 0.069 #/cf, 18% relative humidity (RH), and w=56 grains/# to approximately 75 F. DBT, a density of 0.072#/cf, w=102 gr/#, and 78% RH. A first refrigerant coil utilizing ammonia as a refrigerant is mounted within the air inlet and further reduces the inlet air to 69

F. DBT/59.5 F. WBT, h2=25.5 BTU/#, 56 gr/.#, Density=0.074#/cf, 75% RH. The ammonia coolant from the first cooling coil 1 is cooled and then passed into a second cooling coil 2 within the air inlet to reduce the temperature to 43 F. DBT, h=16.7 BTU/#, W=42 grains/#, Density=0.78 #/cf.

Figure 4:
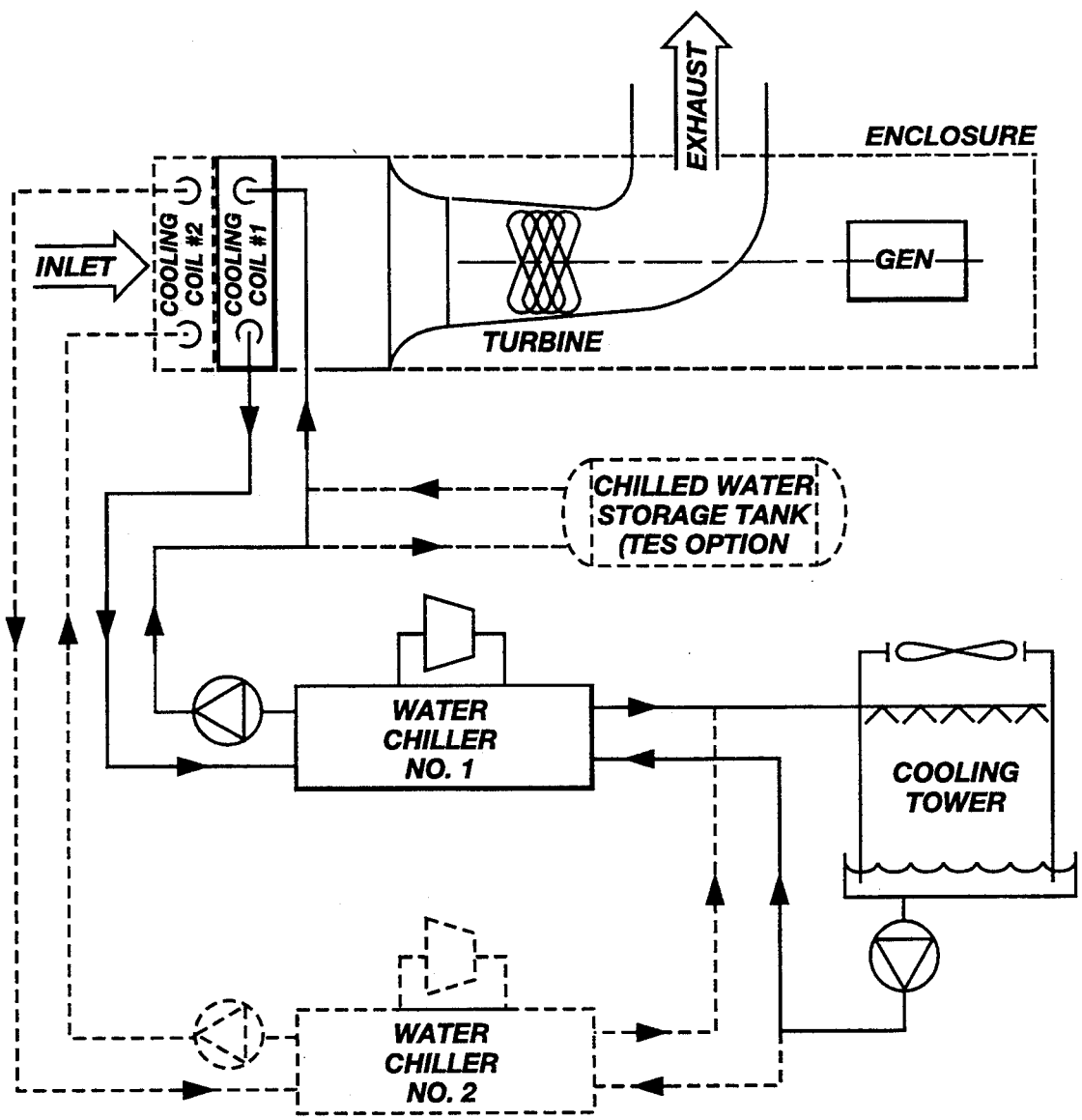
FIG. 4 is a schematic flow diagram of a two stage turbine inlet air water chiller refrigeration system.

The schematic flow diagram of a water chiller turbine air inlet refrigeration system arrangement is shown in FIG. 4. Cooling coil 1 using water as a coolant is mounted downstream from cooling coil 2 within the air inlet of the evaporative cooler (not shown). A first water chiller 1 is operationally connected with the first cooling coil 1. The water coolant from the first cooling coil 1 is cooled and then passed into a second water chiller 2 for circulation through cooling coil 2 to reduce the temperature of the inlet air to the optimal inlet air temperature; thereby optimizing the performance of the turbine driving an electric generator.

An optional chilled water storage tank may be associated with the first cooling coil 1 to store chilled water as coolant feed for the refrigeration system produced during off-peak hours when the price paid for electricity is lowest—i.e. the turbine generator is operated during off peak hours to produce less electricity and more refrigerated coolant.

Figure 5:
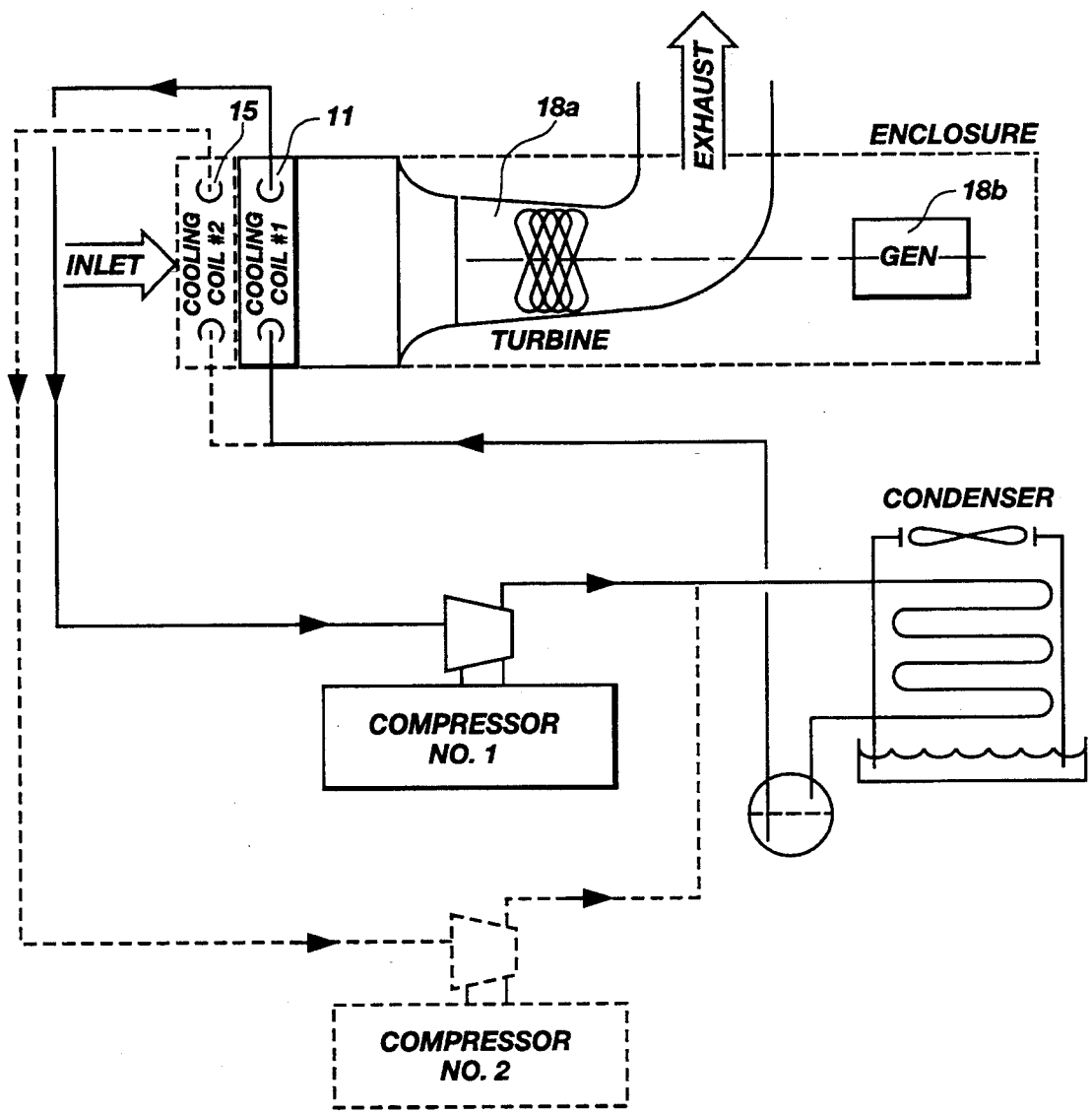
FIG. 5 is a schematic flow diagram of a two stage turbine inlet air direct refrigerant refrigeration system.

FIG. 5 illustrates an ammonia coolant refrigeration system, wherein a first compressor 1 and a second compressor 2 are operably associated with a first cooling coil 1 and a second cooling coil 2 to stepwise reduce the temperature of the inlet air in a similar fashion to that described above.

Figure 6A:
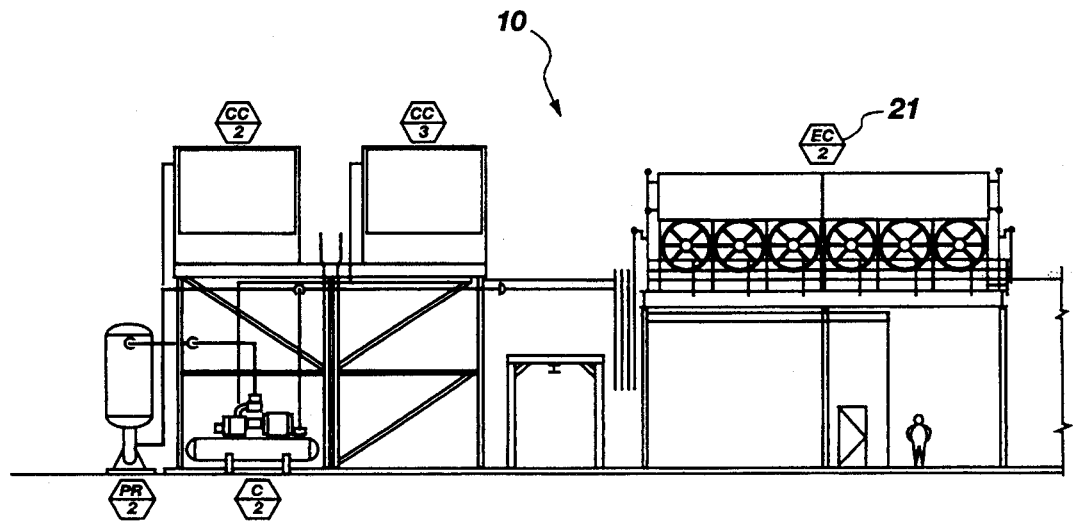
FIG. 6 is a plan and elevation view of a two stage cooling turbine inlet air refrigeration system.
Figure 6B:
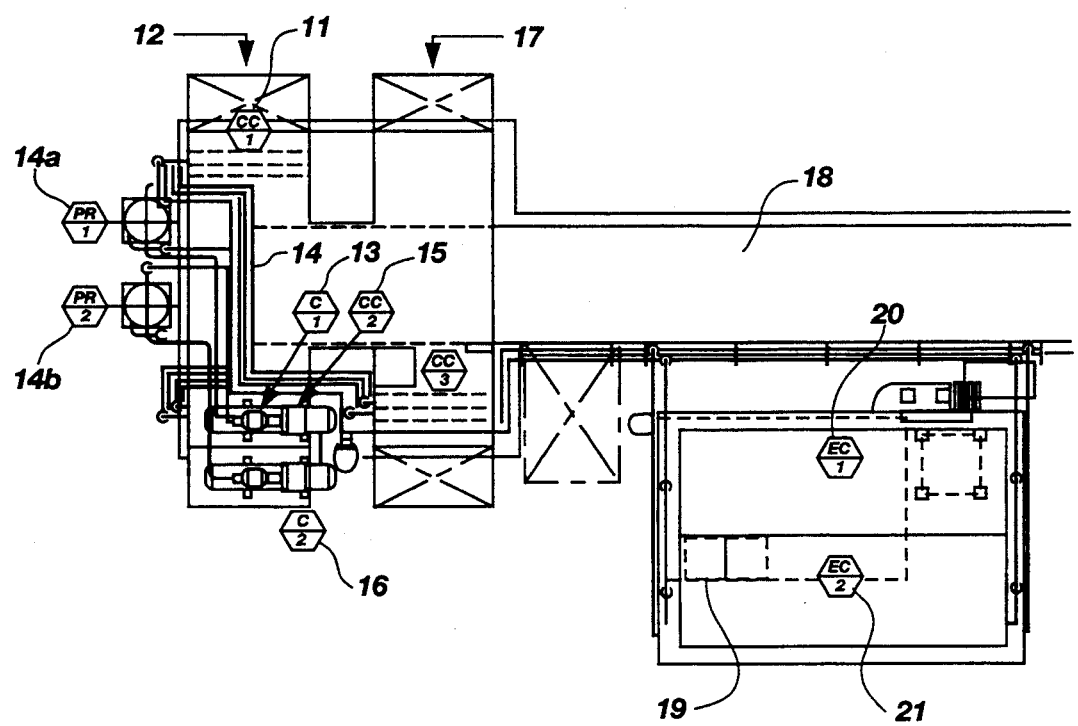

FIG. 6 is a plan view of the turbine air inlet refrigeration system 10. A cooling coil 11 is located within the turbine air inlet 12, and operably associated with a compressor 13. The ammonia coolant of the cooling coil 11 is interconnected as shown with refrigerant lines 14 forming a circuit (including primary and secondary refrigerant storage tanks 14a, 14b) and a second cooling coil 15 operably associated with a second compressor 16 which further reduces the temperature of the inlet air entering the turbine cabinet 17 of the gas turbine generator set 18. The gas turbine generator set 18 consists of a simple cycle natural gas fired General Electric LM5000 turbine 18a driving a Brush 100 MW electric generator 18b shown in FIG. 5. A motor control center 19 controls the ignition and feed of the combustion fuel entering the gas turbine 18a, as well as the electricity required to operate the electrical compressor drives (not shown) to lower the temperature of the cooling coils 11,15. This motor control center 19 has sensors (not shown) within the air inlet to insure that the air entering the turbine cabinet 17 is of constant temperature and pressure to optimize the performance of the gas turbine 18a.

Figure 7:
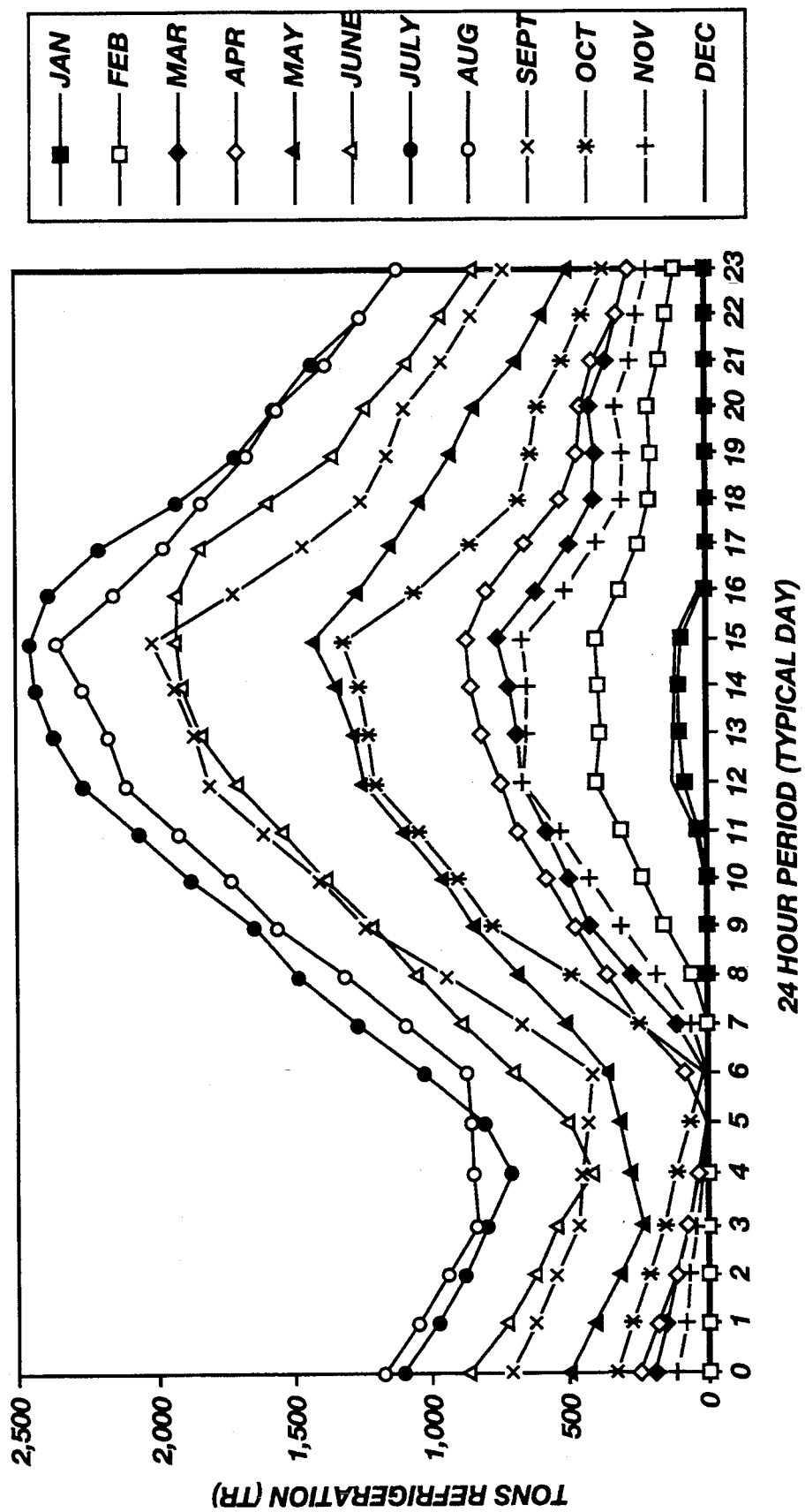
FIG. 7 is a refrigeration load profile for cooling the inlet air of a gas turbine.
Figure 10:
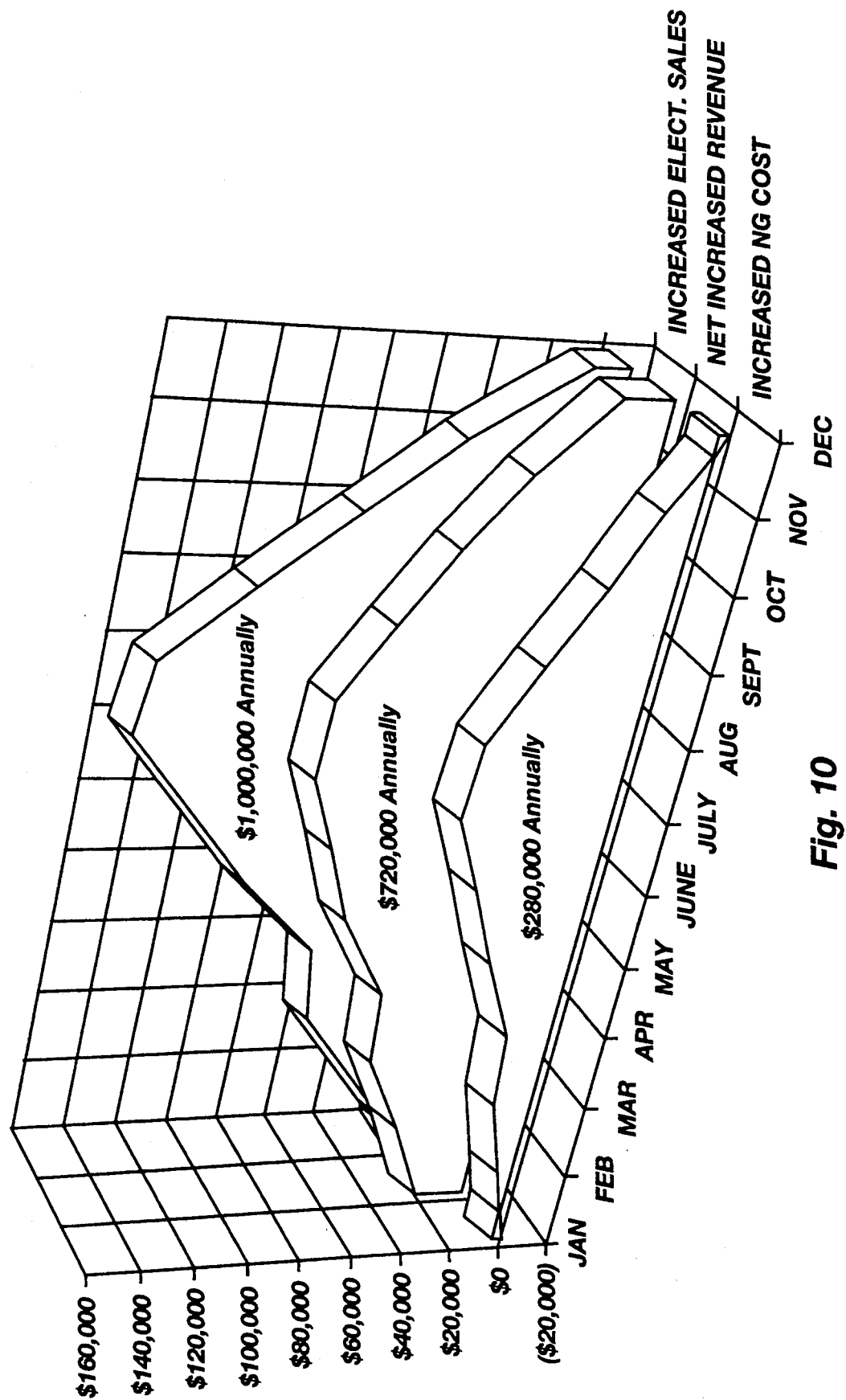
FIG. 10 is a graph of the operating cost analysis of net increases in electrical revenues for the two stage cooling turbine air inlet refrigeration system shown in FIGS. 8 and 9.

Two evaporative condensers 20, 21 are associated with the refrigeration system to dispel heat of compression and condensation within the refrigeration cycle. A typical refrigeration load profile to cool the inlet air over a 24 hour period is shown in FIG. 7. A typical operating cost profile for an LM5000 gas turbine two stage inlet air cooling system is shown in FIGS. 8 and 9. The increases in net revenues from these cost and revenue curves are graphically shown in FIG. 10.

As can be seen from the tables in FIGS. 8 and 9, electrical revenues paid for electricity produced generally vary based on the time of day that these power deliveries are made. Therefore, a computer (not shown) with a revenue/cost algorithm is generally associated with the turbine control center 19 to optimize the hourly net energy outputs by producing maximum electricity during on-peak electrical pricing periods, and stored cooled refrigerant during off-peak pricing periods. The stored cooled refrigerant is then circulated during on-peak electrical pricing periods to optimize the production of electricity with minimal refrigerant costs.

The two stage turbine air inlet refrigeration system shown thus produces significant net revenues by optimizing the performance of the turbine generator set 18.

Although this specification has made reference to the illustrated embodiments, it is not intended to restrict the scope of the appended claims. The claims themselves recite those features deemed essential to the invention.

I claim:

1. A method for optimizing the power output and performance of combustion prime movers such as gas turbines and internal combustion engines having air inlets taking in inlet air at the minimum acceptable inlet air temperature to prevent damage to the prime mover and its auxiliary components for admixture with fuel for combustion, and associated with a prime mover load application to increase power output and reduce fuel consumption, comprising:

a. inputting into a computer processor a data base containing the prime mover's performance output, fuel consumption, heat rate, the load application power, output power, parasitic load consumption, and other related performance system information, b. computer generating optimal thermodynamic cooling efficiencies corresponding to a sectionalized, sequentially divided psychrometric turbine inlet air cooling path enthalpy curve of the average ambient air temperature prime mover performance and the optimum air inlet temperature for maximum prime mover performance, c. Structuring and providing a stage refrigerant cooling system having separate refrigerant cooling components mounted within and associated with the air inlet to provide incremental sequential staged cooling of the inlet air by circulating refrigerant to absorb heat from the inlet air and deliver the absorbed heat to a heat sink to increase the cycle efficiency of the refrigeration system by using cooled condensate to subcool the liquid refrigerant before expansion;

d. Cascading from stage to stage cooled refrigerant from a first cooling stage as feed into a successive subsequent cooling stage to sequentially cool the inlet air to a desired temperature for optimum prime mover performance, e. Inputting into the computer processor current operating costs associated with fuel consumption, maintenance, and other related operating costs of the prime mover, and current revenues from energy generation by the prime mover load application, f. Generating the optimal net revenue performance curve for the prime mover and prime mover load application, and g. Powering and adjusting power means to drive the prime mover and multi-stage refrigerant cooling system in accordance with the optimal net revenue performance curve.

2. A method for optimizing the power output and performance of combustion prime movers, according to claim 1, wherein the psychrometric turbine inlet air cooling path enthalpy curve is divided into multiple substantially equal stages.

3. A method for optimizing the power output and performance of combustion prime movers, according to claim 2, wherein the multi-stage refrigerating system employs direct primary refrigerant as heat transfer media.

4. A method for optimizing the power output and performance of combustion prime movers, according to claim 2, wherein the staged refrigerating system employs indirect secondary coolants such as chilled water, brines, and the like as heat transfer media.

5. A method for optimizing the power output and performance of combustion prime movers, according to claim 1, wherein the inlet air is pre-cooled below the icing point, and then reheated with warm refrigerant to prevent freezing to maximize prime mover performance, and refrigeration cycle efficiency.

6. An apparatus for optimizing the energy power output and performance of combustion prime movers having air inlets taking in inlet air at the minimum acceptable inlet air temperature to prevent damage to the prime mover and its auxiliary components for admixing with fuel for combustion, and associated with a prime mover load application, comprising:
   a. a staged refrigerant cooling system including a first compressor and at least one successive compressor operably associated with a first cooling coil and at least one successive cooling coil mounted within and associated with the air inlet of the prime mover to sequentially cool the inlet air in multiple stages in accordance with a sectionalized, divided, psychrometric turbine inlet air cooling path enthalpy curve showing the average ambient air temperature prime mover performance and the optimum air inlet temperature for maximum prime mover performance by sequentially circulating within the coils cooled refrigerant to absorb heat from the inlet air in stages and deliver the absorbed heat to a heat sink to increase the cycle efficiency of the refrigeration system by using cooled condensate to subcool the liquid refrigerant before expansion;
   b. power means to drive the prime mover and multi-stage refrigerant cooling system compressor components,
   c. transfer and cascading means associated with the cooling system to transport cooled refrigerant from a first cooling stage of the refrigerant cooling system as liquid feed into each successive subsequent cooling stage of the refrigerant cooling system to successively cool the inlet air to the optimum prime mover performance inlet air temperature,
   d. a computer processor with a data base of current operating costs associated with fuel consumption, maintenance, and other related operating costs of the prime mover, and current revenues from energy generation by the prime mover load application, which generates the optimal net revenue performance curve for the prime mover and prime mover load application, and
   f. power controls to adjust the power means to drive the prime mover and staged refrigerant cooling system compressor components in accordance with the optimal net revenue performance curve.

7. An apparatus for optimizing the power output and performance of combustion prime movers according to claim 6, wherein the prime mover is a gas turbine, and the load application is an electrical generator producing electricity.

8. An apparatus for optimizing the power output and performance of combustion engine prime movers according to claim 6, wherein the cooling system employs primary direct refrigerant.

9. An apparatus for optimizing the power output and performance of combustion engine prime movers according to claim 6, wherein the cooling system employs indirect secondary refrigerant cooled by an absorption refrigeration system powered by exhaust heat from the prime mover.

10. An apparatus for optimizing the power output and performance of combustion engine prime movers according to claim 6, wherein the cooling system is a two stage cooling system comprising:
   a. a first cooling coil utilizing a direct refrigerant which reduces the temperature of the inlet air, and
   b. a second cooling coil placed behind the first cooling coil utilizing as liquid feed, the direct refrigerant from the first cooling coil to further reduce the temperature of the inlet air to the desired constant air temperature.

11. An apparatus for optimizing the power output and performance of combustion prime movers according to claim 6, including a computer with a revenue and cost algorithm modelling and simulation program associated with the power controls to optimize hourly net energy outputs.

* * * * *

UNITED STATES PATENT AND TRADEMARK OFFICE
CERTIFICATE OF CORRECTION

PATENT NO. : 5,444,971
DATED : August 29, 1995
INVENTOR(S) : CHARLES R. KOHLENBERGER It is certified that error appears in the above-indentified patent and that said Letters Patent is hereby corrected as shown below:

On the title page, the name of the inventor is mispelled on the second line. "Holenberger" should read --Kohlenberger--

On the title page, after Inventor:, "Holenberger" should read --Kohlenberger--

Signed and Sealed this

Thirty-first Day of October 1995

Attest:

BRUCE LEHMAN

*Attesting Officer*      *Commissioner of Patents and Trademarks*